Feb. 20, 1923.
C. A. HENRY
COUNTERPOISING MECHANISM
Filed Oct. 17, 1921
1,446,254
3 sheets-sheet 2

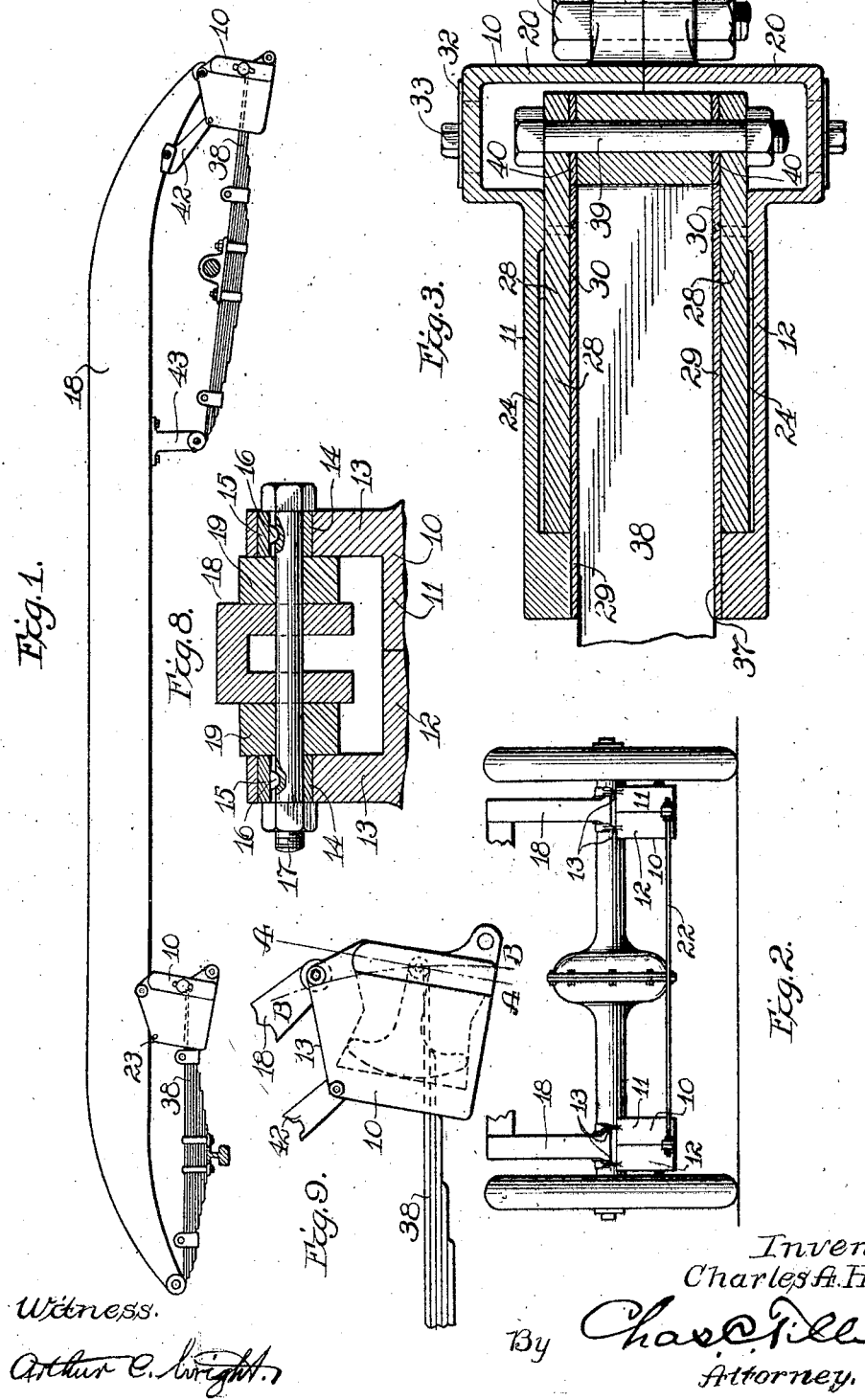

Witness:
Arthur C. Wright

Inventor
Charles A. Henry
By Chas. C. Tillman
Attorney

Feb. 20, 1923.
C. A. HENRY
COUNTERPOISING MECHANISM
Filed Oct. 17, 1921
1,446,254
3 sheets-sheet 3
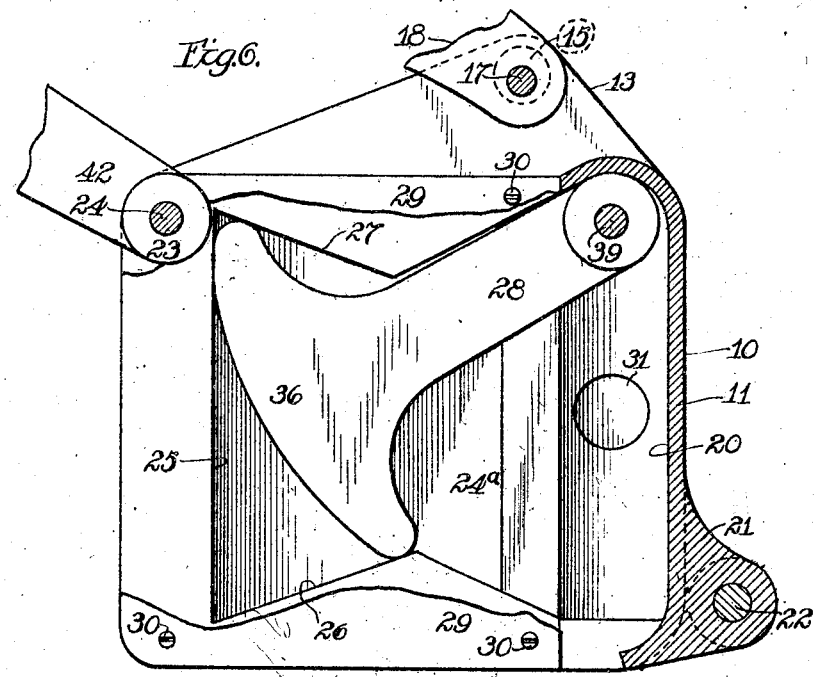
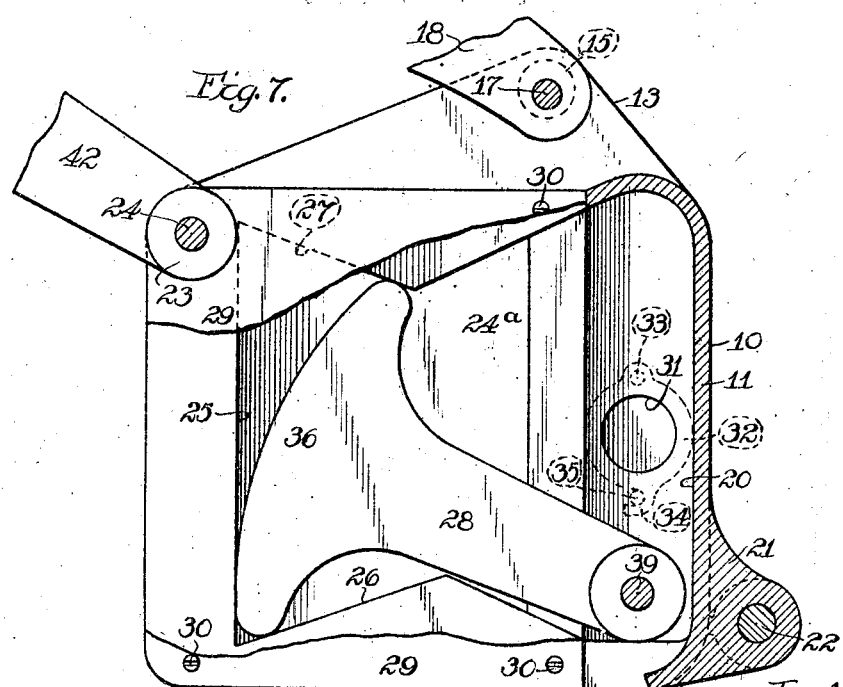
Inventor
Charles A. Henry Patented Feb. 20, 1923.

1,446,254

UNITED STATES PATENT OFFICE.

CHARLES A. HENRY, OF CHICAGO, ILLINOIS.

COUNTERPOISING MECHANISM.

Application filed October 17, 1921. Serial No. 508,192.

*To all whom it may concern:*

Be it known that I, CHARLES A. HENRY, a citizen of the United States, residing at Chicago, in the county of Cook and State of Illinois, have invented certain new and useful Improvements in Counterpoising Mechanism, of which the following is a specification.

This invention embodies improvements in my invention set forth in Letters Patent of the United States Number 1,309,198, issued to me on the 8th of July, 1919, for improvements in counterpoising mechanism, and like the said patented invention, is particularly intended for use on automobiles and ambulances, for reducing to a minimum, or practically eliminating, jolts, shocks, or abrupt vibrations incidental to the travel or movement of such vehicles over uneven surfaces of roads or over protruding obstacles thereon, or depressions therein.

Besides greatly simplifying the construction of the device over that of my patented device, and thereby reducing the cost of manufacture and lessening the time and labor required for assemblage of the parts of the device and its application to a vehicle as one of the objects of my present invention, other objects thereof are the same as set forth in my aforesaid patent, to wit:

To provide a counterpoising mechanism which shall be so made that it can be readily attached to the frame and axles of a vehicle without detracting from the appearance of the latter; to provide means whereby the ordinary or commonly used springs and gears heretofore used in so called shock absorbers may be dispensed with, and the thrusts or movements of the body of the vehicle imparted thereto by the wheels passing over the rough or uneven roads or surfaces thereof will be brought to a poise by substantially counter-balancing or opposing them with substantially equal power or effect, thereby producing almost perfect equilibrium in the body of the vehicle, and so that it will have very slight undulating movements only in the travel of the vehicle.

Other objects and advantages of the invention will be disclosed in the sub-joined description and explanation.

The invention consists in certain peculiarities of the construction, novel arrangement and operation of the various parts thereof as will be hereinafter more fully set forth and specifically claimed.

In the accompanying drawings, which serve to illustrate an embodiment of the invention—

Fig. 1 is a diagrammatic view of a portion of the frame of an automobile or vehicle showing it equipped with my improved mechanism.

Fig. 2 is a rear end view of the chassis or frame of an automobile showing a pair of the devices mounted on the rear portion of the frame in operative connection with the rear springs of the vehicle.

Fig. 3 is a plan sectional view taken on line 3—3 of Fig. 4 of one of the devices for the front portion of the vehicle.

Fig. 6 is a similar view to Fig. 4, but showing one of the devices for the rear portion of the vehicle with the spring thereof omitted and illustrating about the position the toggle or rocking members of the mechanism will occupy when the wheels of the vehicle encounter an obstacle extended above the surface of the road.

Fig. 7 is a similar view of like parts showing about the position the toggle or rocking members of the device will occupy when the wheels of the vehicle encounter a depression in the road.

Figure 5:
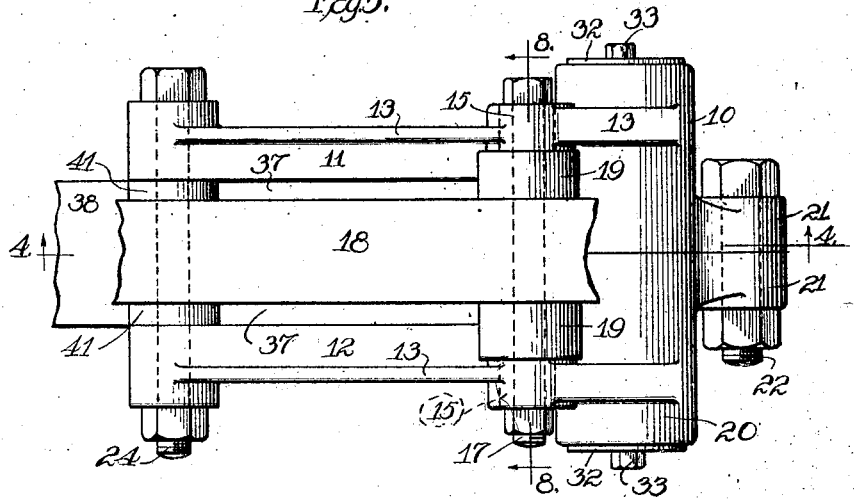
Fig. 5 is a plan view thereof.

Fig. 8 is a horizontal sectional view taken on line 8—8 of Fig. 5 through the bearing of the upper portion of one of the casings of the device which unites it to the frame of a vehicle, and Fig. 9 is a detail view of one of the casings of the device and a part of one of the springs of the vehicle showing diagrammatically by broken lines the direction of the movement of the end of the vehicle spring connected to the device will be caused to make.

Like numerals of reference refer to corresponding parts throughout the different views of the drawings.

To properly equip an automobile or vehicle, four of the devices are employed, two of which are mounted on each side of the frame thereof near the axles as is clearly shown in Figs. 1 and 2 of the drawings. The devices are all of the same construction, and for this reason it is obvious that it is only necessary to describe one of them.

Referring now to the drawings, the reference numeral 10 designates as a whole one of the housings or casings which is made of two counter-parts 11 and 12, each of which has on its upper portion near its outer surface an upwardly and forwardly extended rib 13 which are spaced from one another and are provided with horizontally registering openings 14 for the reception of eccentric collars 15 through which is extended and keyed thereto preferably by means of a Woodruff key 16, a bolt 17 which not only ties the ribs 13 transversely together, but also serves to connect the ribs and casing to the frame 18 at one side of the vehicle, all of which will be readily understood by reference to Fig. 7 of the drawings.

On each side of the frame member 18 the bolt 17 has mounted thereon a collar 19 to properly space the frame member 18 from the ribs 13 of the casing. By reference to Figs. 4 to 6 inclusive of the drawings it will be seen that the bolt 17 is located in the rear upper portions of the ribs 13 as well as rearwardly of the vertical middle of the casing. The rear portion of each of the members of the casing is provided with a vertical enlargement 20 each of which has on its lower rear portion an apertured lug 21 in which aperture is located a bolt 22 for further securing the counter-parts of the casing together. At its front upper corner each of the casings, which are by preference substantially rectangular in shape, is provided with a transverse opening 23 for the reception of a tie-bolt or rod 24 which serves to further secure the counter-parts of the casing together. Each of the said parts of the casing is provided in its inner surface with a cavity 24ª, each of which cavities terminates at its forward portion in a vertically inclined plane 25 and at its lower end in a forwardly and downwardly inclined plane 26. Each of these cavities, by preference, terminates at its upper end in a forwardly and upwardly inclined plane 27, as is clearly shown in Figs. 4 to 6 inclusive. Rearwardly of the adjacent portions of the inclined planes 26 and 27 the cavity of each of the members 11 and 12 of the casing is enlarged to permit of free movement of the outer portion of toggle arms 28 or members, one of which is located in the cavity of each of the counter-parts of the casing.

A plate 29 is secured by means of screws 30 to the inner surface of each of the members 11 and 12 so as to enclose in its cavity one of the toggle arms 28 the rear portions of which extend into the vertically inclined enlargement 20 at the rear of the casing, which enlargement is by preference provided with an opening 31 in each of its side walls employed for the purpose of affording access to the interior of the casing for lubricating or adjusting certain parts of the mechanism. Each of these openings 31 is closed by a door 32 mounted on a pivot 33 on the outer surface of the side wall of the casing so that said door can be swung to one side of the opening 31 which it covers. Each of the doors 32 is provided on its lower portion with a hook 34 to engage a pin 35 on the outer surface of the wall of the casing below said opening for the purpose of holding the door in its closed position.

Each of the toggle arms for the members 11 and 12 of the casing is provided at its forward end with a segmental head 36 which head is transversely elongated with respect to its arm 28 and is of sufficient length to extend from the inclined plane or surface 26 to the inclined plane or surface 27 of the cavity 24ª of the member of the casing in which it is located, and in such a way as to contact with said planes. The ends of the head 36 are rounded as shown, and the front arcuate surface of the head 36 contacts with the vertically inclined plane or surface 25 no matter what position the toggle arm may assume. The front wall of the casing 10 is provided between the plates 29 with a vertical slot 37 through which the rear end of one of the vehicle springs 38 is extended into the casing to a point near the rear wall thereof. When thus positioned, it is apparent that the spring 38 will lie between the pair of toggle arms 28 of the casing to the rear ends of which arms the rear end of the spring 38 is loosely connected by a transverse bolt 39 extended through suitable openings in said parts.

By reference to Fig. 3 of the drawings, it will be observed that the rear ends of the plates 29 terminate at or near the front wall of the enlargement 20 of each of the members of the casing. A washer 40 is interposed between the rear end of each of the toggle arms 28 and the rear end of the spring 38 or that portion thereof which is loosely mounted on the rod 39. By reference to Figs. 1, 4 and 5 of the drawings, it will be understood that the front part of the side 18 of the frame of the vehicle will rest on the tie bolt 24 and in order to prevent lateral movement of the casing, a collar 41 located on the bolt 24 on each side of the frame member 18 is employed. This arrangement applies to the front casings only. The rear casings are connected to the frame members 18 by links 42 which are connected at one of their ends to the tie rods 24 and at their other ends to the frame member 18 forwardly of the supporting rods 17 and the eccentrics thereon.

The front end of each of the rear springs 38 of the vehicle is connected to a bracket 43 depending from the frame of the vehicle, and the front ends of the front springs 38 of the vehicle are connected to the front ends or portions of the sides of the vehicle frame as will be understood by reference to Fig. 1 of the drawings. By this arrangement it is manifest that the casings 10 can be fixed on the frame of the vehicle with their vertically inclined walls at any desired angle with respect to the lower surface thereof by simply adjusting the eccentrics 15 on the supporting rods 17 so as to hold said casings with their vertically inclined walls at the desired angles to the vehicle frame, which angles I have found by experience to be about 80 degrees.

While I have shown and described the casings as each having a pair of the toggle arms 28 and as each having a pair of cavities for the reception and operation of said arms, yet I desire it to be understood that one toggle arm in each casing only may be used, which of course would make the use of the other cavity unnecessary. I have also shown each cavity 24ª terminating at its upper front portion with the upwardly and forwardly inclined plane or wall 27, yet this plane or wall may be dispensed with whether one or a plurality of arms is used in each of the casings.

From the foregoing and by reference to the drawings, it will be readily understood and clearly seen that when the frame of the vehicle is equipped with four of the devices, located as above stated and as shown in Fig. 1, two on each side of the frame and near the ends of the axles in engagement with the rear ends of the vehicle springs, the parts will occupy their normal or neutral positions shown in Fig. 9 of the drawings.

In the movement of the vehicle, should the wheels thereof pass into a depression, the toggle arms of the casing adjacent said wheels will assume about the position shown in Fig. 7 of the drawings, provided the depression into which the wheel or wheels of the vehicle has passed is deep enough to cause such movement of the said parts, but if not deep enough, it will be understood that the movements of the parts will be correspondingly less or shorter.

Figure 4:
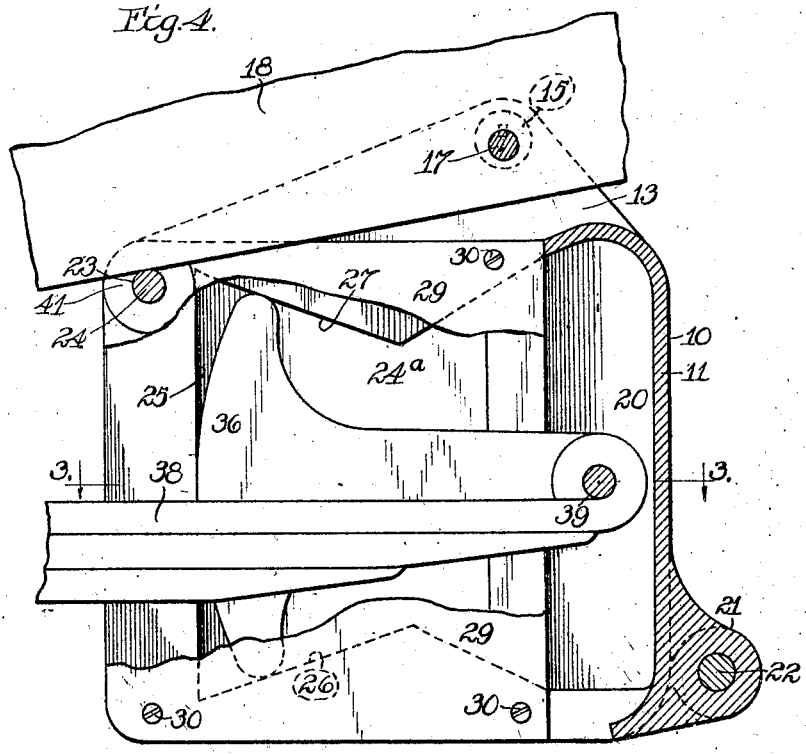
Fig. 4 is a vertical sectional view thereof taken on line 4—4 of Fig. 5 looking in the direction indicated by the arrows showing the casing of one of the devices in a vertical position for the convenience of illustration but vertically inclined with respect to the frame.

In the event of the wheels of the vehicle striking a protruding obstacle on the surface of the road, the movement of the parts will be to about the positions shown in Fig. 6 of the drawings, in either of which cases it will be understood that the segmental heads of the toggle arms will co-act with the vertically inclined plane 25, and the forwardly and downwardly inclined plane 26 of each of the casings, in such a way as to roll on said planes or shift their positions in contact therewith from the neutral position shown in Fig. 4 to that shown in Fig. 6 as well as to that shown in Fig. 5 of the drawings. As the springs 38 of the vehicle are connected to the rear ends of the toggle arms, and as said arms are independently movable of the casing in which they are located, it is manifest that said arms will be caused to exert movable toggle pressure on the surface of the casing with which they contact and thus cause the springs to be extended and contracted and the rear ends of the springs to move in about the plane shown by the broken line A—A in Fig. 9 of the drawings, whereas if such means were not employed, the rear end of the vehicle spring or springs would describe an arc as shown by the broken line B—B in the last named figure. Thus it will be seen and understood that in the downward movement of the support for the spring or springs, they will be contracted and on the upward movement of said support, be extended. For this reason each of the casings 10 which depend from the frame of the vehicle are so mounted on said frame that the angles of the vertically inclined planes 25 and the rear walls of the casings can be adjusted and then fixed with respect to the frame at desired angles, usually about eighty degrees.

By the above mentioned arrangement and construction of the parts, it will be understood that the downward or upward movement of the body of the vehicle will be opposed by substantially equal power or effect, thus producing almost perfect equilibrium in the body of the vehicle and rendering its movements of a slight undulating character.

Having thus fully described my invention, what I claim as new and desire to secure by Letters Patent is—

1. In a mechanism of the class described, the combination with a member mounted on and in fixed relation to a movable body and having a vertically inclined plane, of a body supporting spring carried at one of its ends by said body and intersecting said plane, and means connected to the other end of the spring and extending longitudinally therewith and co-acting in movable toggle effect with said plane to cause the last named end of the spring to move in a line parallel to said plane in the vertical movements of said body.

2. In a mechanism of the class described, the combination with a member mounted on and in fixed relation to a movable body and having a vertically inclined plane and at the lower portion of said plane another plane downwardly inclined and intersecting the first named plane, of a body supporting spring carried at one of its ends by said body and intersecting the vertically inclined plane, and means connected to the other end of the spring and co-acting with said planes to cause the last named end of the spring to move in a line parallel to said vertically inclined plane in the vertical movements of said body.

3. In a device of the class described, the combination with a member mounted on and in fixed relation to a movable body and having a vertically inclined plane terminating at its lower portion in an intersecting downwardly inclined plane, of a body supporting spring carried at one of its ends by said body and intersecting the vertically inclined plane, a wheeled support on said spring, and means connected to the other end of the spring and co-acting with said planes to cause the spring to be contracted on the downward movements of said support and to be extended in the upward movement thereof beyond the normal position of the spring.

4. In a mechanism of the class described, the combination with a member mounted on and in fixed relation to a movable body and having a vertically inclined plane terminating at its upper portion in an intersecting upwardly inclined plane and terminating at its lower portion in an intersecting downwardly inclined plane, of a body supporting spring carried at one of its ends by said body and intersecting the vertically inclined plane, and a toggle element loosely mounted on the other end of the spring and co-acting with at least the said vertically inclined plane and the upwardly inclined plane at the lower portion thereof.

5. In a mechanism of the class described, the combination with the frame of a vehicle, of a casing mounted thereon and in fixed relation thereto and depending therefrom, of a spring secured at one of its ends to the frame in front of said casing and extended at its other end thereinto, said casing having a cavity in one of its side walls terminating at its front portion in a vertically inclined plane and at its lower portion in a downwardly and forwardly inclined plane intersecting the vertically inclined plane, a toggle arm located in said cavity and loosely secured at its rear end to the rear end of said spring and having a segmental head at its front end for co-action with said planes.

6. In a mechanism of the class described, the combination with the frame of a vehicle, of a casing mounted thereon in fixed relation thereto and depending therefrom, said casing having a cavity in one of its side walls terminating at its front portion in a vertically inclined plane and at its lower portion in a downwardly and forwardly inclined plane intersecting the vertically inclined plane and at its upper portion in an upwardly and forwardly inclined plane, a spring secured at one of its ends in front of said casing and extended at its other end thereinto, and a toggle arm located in said cavity and loosely secured at its rear end to the rear end of said spring and having a segmental head at its front end for co-action with said planes.

7. In a mechanism of the class described, the combination with the frame of a vehicle, of a casing mounted thereon and in fixed relation thereto and depending therefrom, of a spring secured at one of its ends to the frame in front of said casing and extended at its other end thereinto, said casing having a cavity in each of its side walls each cavity terminating at its front portion in a vertically inclined plane and at its lower portion in a downwardly and forwardly inclined plane intersecting the vertically inclined plane, a toggle arm located in each of said cavities and loosely secured at their rear ends to the rear end of said spring and having a segmental head at its front end for co-action with said planes.

8. In a mechanism of the class described, the combination with the frame of a vehicle, of a casing mounted thereon and in fixed relation thereto and depending therefrom, of a spring secured at one of its ends to the frame in front of said casing and extended at its other end thereinto, said casing having a cavity in each of its side walls, each cavity terminating at its front portion in a vertically inclined plane and at its lower portion in a downwardly and forwardly inclined plane intersecting the vertically inclined plane and at its upper portion in an upwardly and forwardly inclined plane intersecting the vertically inclined plane, a toggle arm located in each of said cavities and loosely secured at their rear ends to the rear end of said spring and having a segmental head disposed vertically at its front end for co-action with said planes, the ends of said head being rounded.

9. In a mechanism of the class described, the combination with the frame of a vehicle, of a casing mounted thereon and in fixed relation thereto, of a spring secured at one of its ends to the frame in front of said casing and extended at its other end thereinto, said casing being adjustably mounted on the frame of the vehicle and having a cavity in at least one of its side walls, said cavity terminating at its front portion in a vertically inclined plane and at its lower portion in a downwardly and forwardly inclined plane intersecting the vertically inclined plane, a toggle arm located in said cavity and loosely secured at its rear end to the rear end of said spring and having a segmental head disposed vertically at its front end for co-action with said planes.

10. In a mechanism of the class described, the combination with a vehicle frame and one of its springs, of a casing mounted on said frame, said casing having in one of its walls a vertical slot and along its side an inwardly faced vertically inclined plane, a toggle arm located in the casing and having a segmental head in contact with said plane, the said spring of the vehicle extended into the casing through said slot and alongside the toggle arm and loosely connected to the same near its end opposite its segmental head, said casing having in its lower portion a plane inclined toward the vertically inclined plane for constant co-action with the lower portion of the said head.

CHARLES A. HENRY.